United States Patent
Starr

(10) Patent No.: US 6,971,597 B2
(45) Date of Patent: Dec. 6, 2005

(54) ROTATABLE TRAY FOR FOOD PROCESSOR

(75) Inventor: William D. Starr, Glen Allen, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 86 days.

(21) Appl. No.: 10/782,622

(22) Filed: Feb. 19, 2004

(65) Prior Publication Data

US 2005/0194484 A1    Sep. 8, 2005

(51) Int. Cl.[7] .................... B02C 17/02; B02C 1/08
(52) U.S. Cl. ................... 241/92; 241/278.1
(58) Field of Search ............... 241/92, 278.1, 241/282.1, 282.2

(56) References Cited

U.S. PATENT DOCUMENTS

| | | | |
|---|---|---|---|
| 1,157,013 A | * | 10/1915 | Lewis ................ 241/92 |
| 3,892,365 A | | 7/1975 | Verdun |
| 4,194,697 A | | 3/1980 | Lembeck |
| 4,240,338 A | | 12/1980 | McClean |
| 4,297,038 A | | 10/1981 | Falkenbach |
| 4,523,720 A | * | 6/1985 | Behringer et al. ........ 241/37.5 |
| 4,589,599 A | | 5/1986 | Williams |
| 5,257,575 A | | 11/1993 | Harrison |
| 5,355,784 A | | 10/1994 | Franklin |
| 5,395,060 A | | 3/1995 | Hackel |
| 5,417,152 A | | 5/1995 | Harrison |
| 5,421,248 A | | 6/1995 | Hsu |
| 5,445,070 A | | 8/1995 | Rebel |
| 5,896,812 A | | 4/1999 | Basora |
| 5,921,485 A | | 7/1999 | Plavcan |
| 6,418,837 B1 | | 7/2002 | Obersteiner |
| 2002/0046660 A1 | | 4/2002 | Obersteiner |

* cited by examiner

Primary Examiner—Derris H. Banks
Assistant Examiner—Faye Francis
(74) Attorney, Agent, or Firm—Akin Gump Strauss Hauer & Feld, LLP

(57) ABSTRACT

A food processor for processing foodstuffs having a base housing, a motor, a drive shaft, a tool, a bowl, a lid and a tray. The tool is rotatably securable to the drive shaft and rotatable by the motor. The bowl is removably securable to the base housing and includes an inner surface area. The lid has an inner surface area. The lid is removably securable to the bowl to create a processing chamber between the inner surface areas of the bowl and lid in an assembled position. The tray is removably securable within the processing chamber and is manually rotatable relative to the bowl and lid, independently of the drive shaft and tool, in the assembled position.

15 Claims, 4 Drawing Sheets

ROTATABLE TRAY FOR FOOD PROCESSOR

BACKGROUND OF THE INVENTION

The present application is directed to processing foodstuff and, more particularly, to a rotatable tray for use within a food processor and configured for compartmentalizing processed foodstuff.

Food processors are well known in the art. Food processors generally include a drive motor which rotates a cutting tool within a removable bowl. Food to be processed is fed to the cutting tool to be chopped, ground, or sliced. The processed food is then maintained within a removable bowl.

The use of such a food processor becomes inconvenient when multiple, different foodstuffs must be processed and kept separated. A user is required to essentially disassemble the food processor in order to remove the processed foodstuff from within the bowl in order to keep the processed foodstuff separated from other foodstuffs to be processed subsequently. It would be desirable to have a food processor that would enable the user to keep different processed foodstuffs separated within the bowl without requiring the user to disassemble the food processor and remove the processed foodstuff from within the bowl before beginning to process a different foodstuff.

BRIEF SUMMARY OF THE INVENTION

Briefly stated, the present invention is a food processor for processing foodstuffs. The food processor comprises a base housing and a motor disposed within the base housing. The drive shaft is operatively engaged with the motor and protrudes from the base housing. The motor causes rotation of the drive shaft. The tool is rotatably securable to the drive shaft. The bowl is removably securable to the base housing and includes an inner surface area. A lid having an inner surface area is removably securable to the bowl to create a processing chamber between the inner surface areas of the bowl and lid in an assembled position. A tray is removably securable within the processing chamber. The tray is manually rotatable relative to the bowl and lid independent of the drive shaft and tool in the assembled position.

In another aspect, the present invention is a combination bowl and internal rotatable tray for a food processor having a base housing. The bowl is removably secured to the base housing. The bowl has an inner surface area. The lid has an inner surface area. A lid, having an inner surface area, is removably securable to the bowl to create a processing chamber between the inner surface areas of the bowl and lid in an assembled position. The tray is disposed within the processing chamber and is rotatable with respect to at least one of the lid and the bowl. The tray has a peripheral wall, a base wall, and plurality of interior walls. The interior walls extend from the peripheral wall to create a plurality of cavities. At least a portion of the tray is accessible by a user through at least one of the lid and the bowl in order to manually rotate the tray with respect to the bowl and the lid.

BRIEF DESCRIPTION OF THE SEVERAL VIEWS OF THE DRAWINGS

The foregoing summary, as well as the following detailed description of a preferred embodiment of the present invention, will be better understood when read in conjunction with the appended drawings. For the purposes of illustrating the food processor of the present invention, there is shown in the drawings the embodiment which is presently preferred. It should be understood, however, that the invention is not limited to the precise arrangements and instrumentalities shown.

In the drawings.

DETAILED DESCRIPTION OF THE INVENTION

Figure 1:
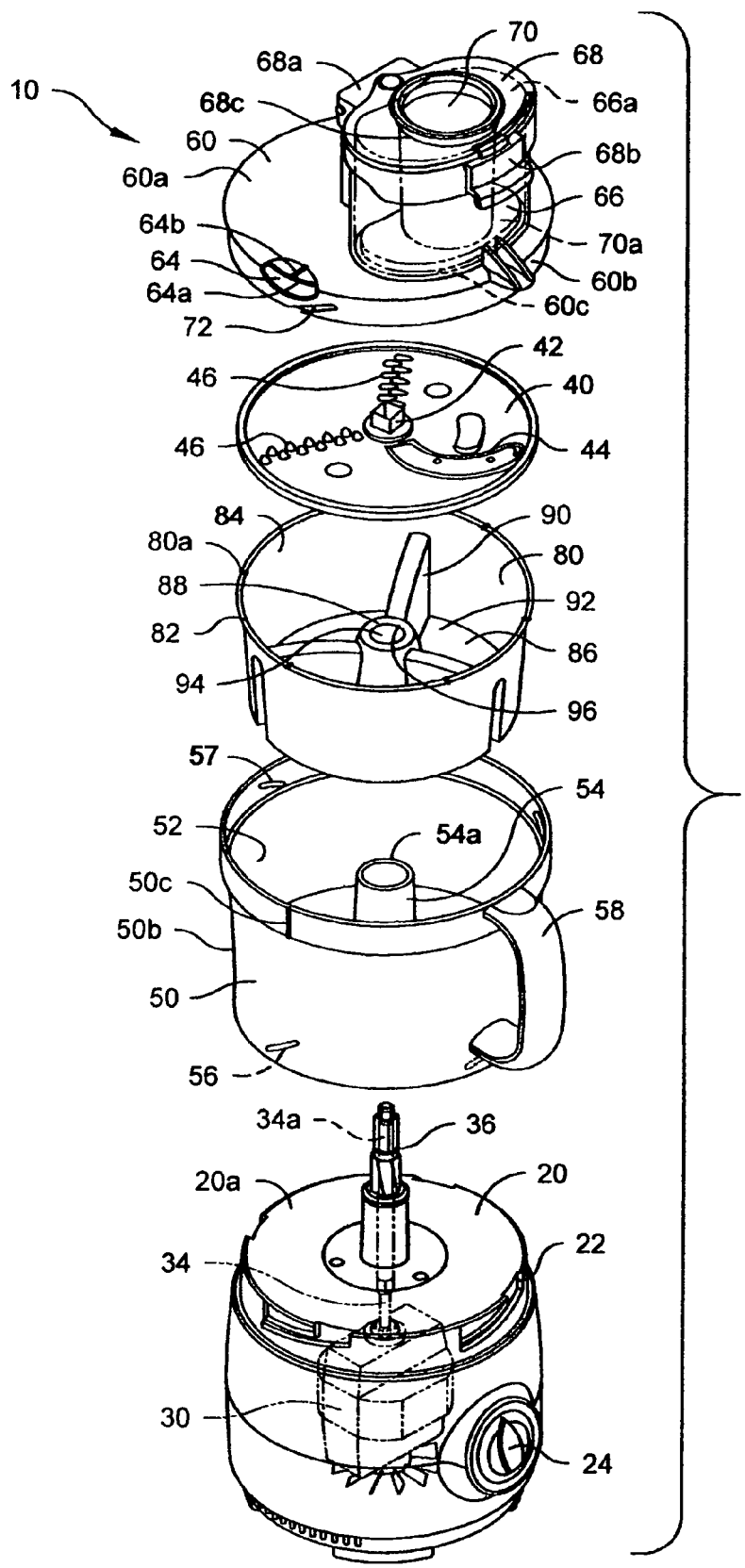
FIG. 1 is an exploded view of a food processor in accordance with the present invention.

Certain terminology is used in the following description for convenience only and is not limiting. The words "right," "left," "upper," and "lower" designate directions in the drawings to which reference is made. The words "inwardly" and "outwardly" refer to directions toward and away from, respectively, the geometric center of the food processor and components thereof. The terminology includes the above-listed words, derivatives thereof, and words of similar import.

Referring to the drawings in detail, wherein like numerals indicate like elements throughout, there is shown in FIGS. 1–4 a preferred embodiment of a tray 80 for a food processor 10 for the compartmentalizing of foodstuff within a bowl 50, in accordance with the present invention.

Referring to FIG. 1, the food processor 10 has a generally a barrel-shaped base housing 20. The base housing 20 is preferably made of plastic, although it is within the spirit and scope of the present invention that the base housing 20 be made of another material, such as metal, for instance. The base housing 20 has a motor 30 (shown in phantom) disposed within. The motor 30 is preferably a conventional electric motor. The motor 30 is operatively engaged with a drive shaft 34 to cause the drive shaft 34 to rotate. The motor 30 is oriented such that the drive shaft 34 extends upwardly from the motor 30, extending outwardly and/or protruding from the center of a generally circular top surface 20a of the base housing 20. The base housing 20 further has a control 24 electrically connected to the motor 30 to enable a user to control the speed of the motor 30. Although the control 24 is portrayed as a dial, it is understood by those skilled in the art that the control 24 could take another form, such as buttons, a toggle switch, a slide switch, or the like. A terminal end 34a of the drive shaft 34 extends outwardly from the base housing 20 and has a plastic adapter 36 fixedly engaged thereon and rotatable therewith.

Figure 2:
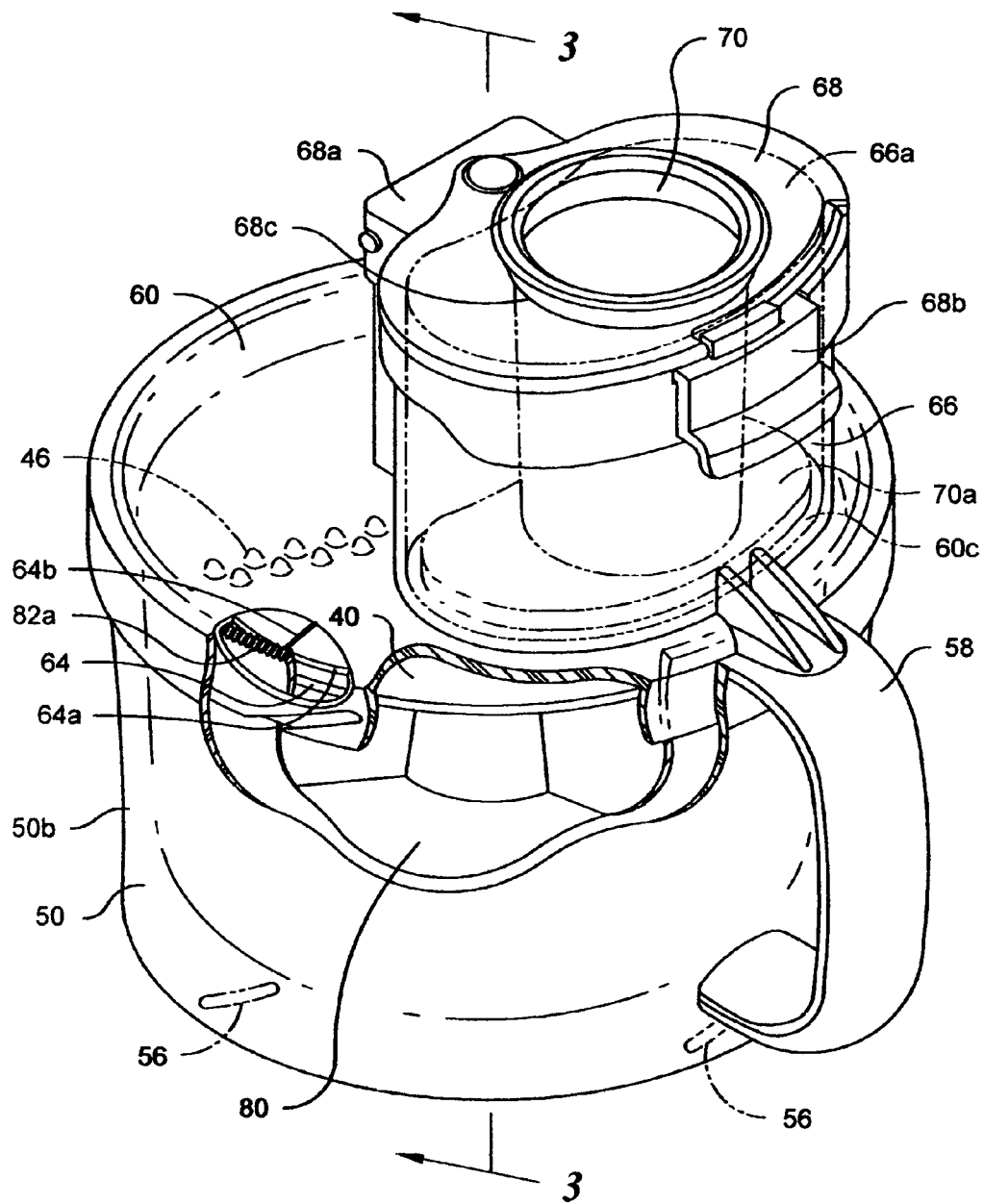
FIG. 2 is a top perspective view of a bowl and a lid for the food processor of FIG. 1, partially cut away to expose a cutting tool and a tray.
Figure 3:
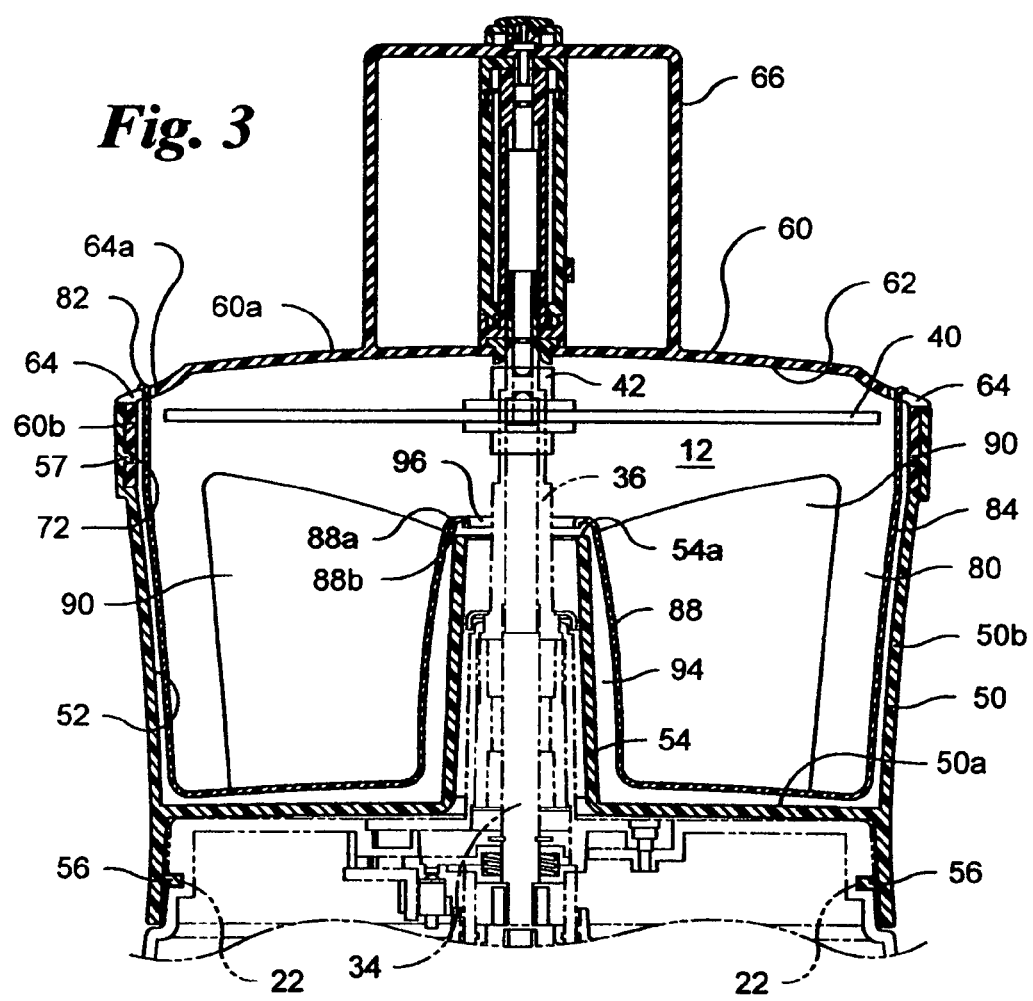
FIG. 3 is a partial cross-sectional view of the food processor of FIG. 1, taken along line 3—3 of FIG. 2.
Figure 4:
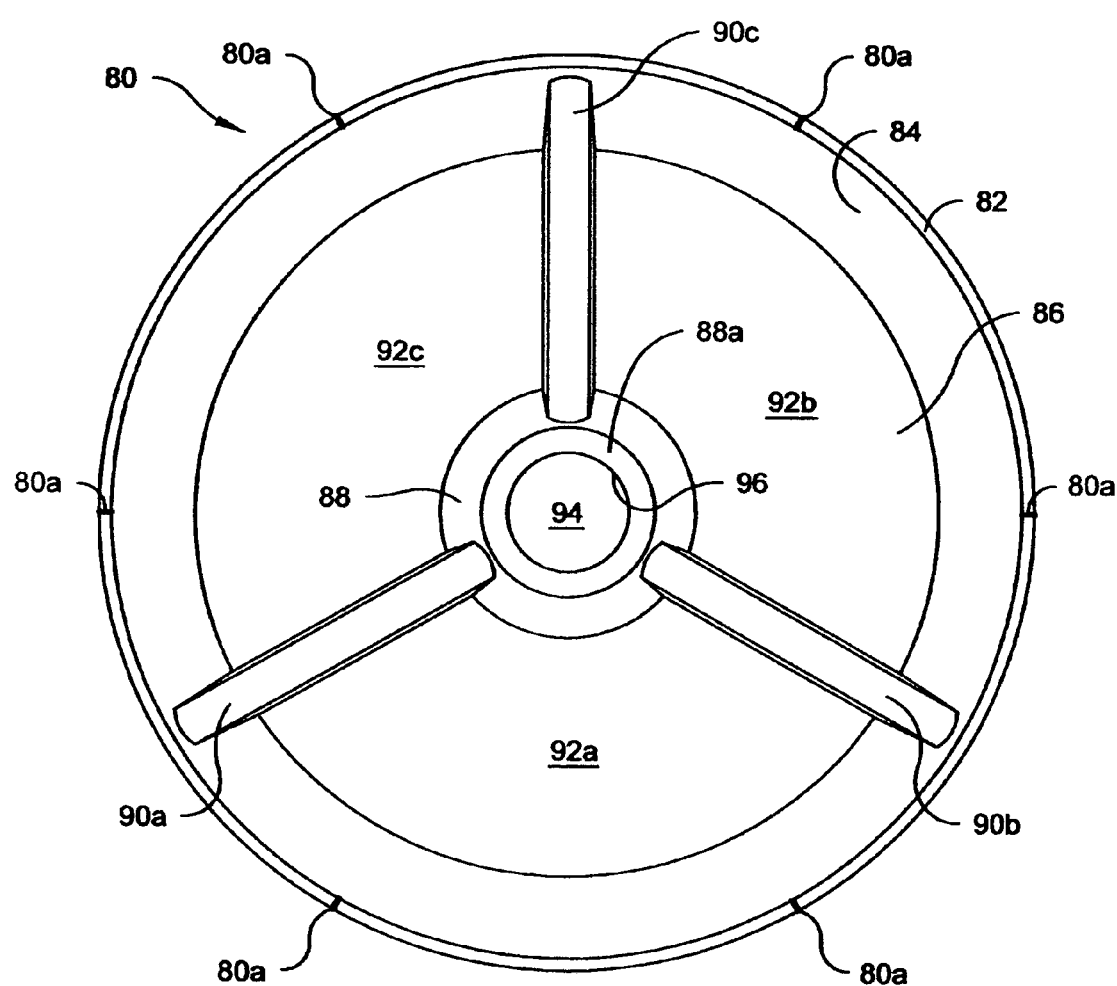
FIG. 4 is a top plan view of the tray of the food processor of FIG. 1.

Referring to FIGS. 1–3, the bowl 50 has a generally cylindrical sidewall 50b and a generally circular bottom wall 50a engaged with and generally perpendicular to the sidewall 50b and located slightly upwardly from a bottom edge of the sidewall 50b. The bowl 50 is removably securable to the base housing 20. Preferably, the bowl 50 has first protrusions 56 extending inwardly from an interior surface of the sidewall 50b and located between the base wall 50a and the bottom edge of the sidewall 50b. The first protrusions 56 slidingly engage within corresponding slots 22 in the side wall of the base housing 20, proximate the top 20a, to retain the bowl 50 on the base housing 20. Extending upwardly from the center of the bottom wall 50a of the bowl 50 is a generally cylindrical central tube 54 sized to accommodate the drive shaft 34 and adapter 36 extending therethrough when the bowl 50 is secured to the base housing 20 in an assembled position. Preferably, at least a portion of the adapter 36 extends above a top edge 54a of the central tube 54 when in the assembled position. The interior surfaces of the sidewall 50b and the bottom wall 50a generally define an inner surface area 52 of the bowl 50. A handle 58 is integrally molded to the sidewall 50b, extending outwardly therefrom, to provide the user with a gripping surface with which to pick up, carry, and otherwise handle the bowl 50.

Although the base housing 20 is portrayed as being generally barrel-shaped, it is within the spirit and scope of the present invention that the base housing 20 be of a different shape as long as the base housing 20 can still perform its intended functions, as described herein. For instance, the base housing could be in the shape of a cube or parallelepiped. Additionally, although the bowl 50 is shown as being removably retained at the top 20a of the base housing 20, it is within the spirit and scope of the present invention that the base housing 20 be generally L-shaped when viewed from the side, such that the motor 30 is disposed within the vertically-oriented portion and the bowl 50 is disposed on top of the horizontally-oriented portion.

A cutting tool 40 is rotatably securable to the drive shaft 34. That is, the cutting tool 40 is rotatably fixed to the adapter 36 proximate the terminal end 34a of the drive shaft 34 and is positioned within the bowl 50 above the top edge 54a of the central tube 54, when in the assembled position. Preferably, the cutting tool 40 is a generally circular metallic disk having a plurality of grating holes 46 and at least one slicer blade 44 formed therein as is well understood by those of ordinary skill in the art. A tool hub 42 is positioned generally at the center of the cutting tool 40. The tool hub 42 is sized and shaped so as to allow the cutting tool 40 to be slid downwardly onto and upwardly off of the adapter 36 while preventing rotational motion of the cutting tool 40 with respect to the adapter 36 and the drive shaft 34 when the cutting tool 40 is retained on the adapter 36. In this way, the interaction of the tool hub 42 with the adapter 36 allows the motor 30 to rotate the cutting tool 40. Preferably, the adapter 36 is in the shape of a parallelepiped having a square cross-section and the tool hub 42 has a square-shaped hole there through sized so as to slide easily onto and off the adapter 36.

The food processor 10 further has a lid 60 that is removably securable to a top of the bowl 50. Preferably, the bowl 50 has second protrusions 57 extending inwardly from the sidewall 50b proximate the top of the bowl 50 that engage within corresponding lid slots 72 in a sidewall 60b of the lid 60 proximate its bottom in order to retain the lid 60 on the bowl 50. The lid 60 has a generally circular, slightly rounded top wall 60a. The sidewall 60b is integral with and extends downwardly from an outer edge of the top wall 60a. Interior surfaces of the top wall 60a and the sidewall 60b collectively form an inner surface area 62 of the lid 60.

Extending upwardly and generally perpendicularly from the top wall 60a of the lid 60 is a feed tube 66. The feed tube 66 is generally ovular in shape and located off center on the top wall 60a between a center and the outer edge of the top wall 60a. The feed tube 66 provides a passageway from a mouth 66a at the top of the feed tube 66 to a hole 60c in the top wall 60a of the lid 60, through which foodstuff can be inserted into the bowl 50. When in the assembled position, the lid 60 is engaged with the top of the bowl 50, such that the inner surface area 52 of the bowl 50 and the inner surface area 62 of the lid 60 define a processing chamber 12 wherein the foodstuff entering from the feed tube 66 is processed by the cutting tool 40.

A feed tube lid 68 is pivotably mounted to the top of the feed tube 66 to allow the user to open the feed tube lid 68 when loading foodstuff into the feed tube 66 and close the feed tube lid 68 during operation of the food processor 10. Preferably, a hinge 68a pivotably mounts the feed tube lid 68 to the feed tube 66, although it is within the spirit and scope of the present invention that the feed tube lid 68 be attached to the feed tube 66 in another manner, such as slidably engaged or removably engaged. A latch 68b is disposed on the feed tube lid 68 oppositely from the hinge 68a and engages with a corresponding abutment (not shown) on the feed tube 66 to retain the feed tube lid 68 in a closed position. The latch 68b helps prevent the feed tube lid 68 from inadvertently opening at inopportune times, such as during use of the food processor 10. The feed tube lid 68 has a generally circular hole 68c therethrough to accommodate a generally cylindrical food pusher 70 (shown in phantom in FIGS. 1 and 2) slidably disposed within the hole 68c. The food pusher 70 has an enlarged foot 70a which corresponds to the shape of the feed tube 66 to allow the user to push the foodstuff within the feed tube 66 downwardly toward the cutting tool 40 and into the bowl 50, when in the assembled position. While a feed tube 66 with a pivotable feed tube lid 68 is shown, it is understood by those of ordinary skill in the art that a conventional feed tube with no lid could be used without departing from the spirit and scope of the present invention.

Referring now to FIGS. 1–4, the tray 80 is removably securable within the processing chamber 12. The tray 80 is manually rotatable relative to the bowl 50 and the lid 60 independent of the drive shaft 34, the adapter 36, and the cutting tool 40, when in the assembled position. The lid 60 includes at least one opening 64 that exposes a portion of the tray 80 when in the assembled position. Preferably, the lid 60 includes two diametrically opposed openings 64 disposed in the lid 60 at the intersection of the top wall 60a with the sidewall 60b.

The tray 80 includes a generally cylindrical peripheral wall 84, a generally circular base wall 86 engaged with a bottom edge of the peripheral wall 84, a generally frusto-conical central hub 88 extending upwardly from the center of the base wall 86, and a plurality of interior walls 90 extending radially from the hub 88 to the peripheral wall 84 to create a plurality of cavities 92. The interior walls 90 extend upwardly from the base wall 86 between the central hub 88 and the peripheral wall 84. Preferably, top edges of the interior walls 90 are slanted upwardly, rising from just below an apex 88a of the central hub 88 to the peripheral wall 84, as best shown in FIGS. 1 and 3.

The tray 80 includes a rim 82 at the top of the peripheral wall 84. When in the assembled position, portions of the rim 82 are exposed through the openings 64. The exposed portions of the tray 80 are graspable by the user in order to manually to rotate the tray 80 relative to the lid 60 and the bowl 50 when in the assembled position. Preferably, the rim 82 has knurling 82a to enhance the grip of the user so as to better enable the user to rotate the tray 80.

Preferably, the plurality of interior walls 90 is comprised of a first interior wall 90a, a second interior wall 90b, and a third interior wall 90c. Preferably, the interior walls 90 are equidistantly spaced from one another so as to divide the tray 80 into equal thirds, defining first, second, and third cavities 92a, 92b, 92c within the tray 80. Although the tray 80 is portrayed as having three equally-sized cavities 92, it is within the spirit and scope of the present invention that there be more or less than three cavities 92 or that the cavities 92 be of different sizes. The tray 80 is manually rotatable relative to the bowl 50 and the lid 60 when in the assembled position such that at least one of the cavities 92 can be aligned with the mouth 66*a* of the feed tube 66.

The hub 88 includes a bore 94 therethrough to allow for the drive shaft 34 and the adapter 36 to extend through the bore 94 and out from a hole 96 at the apex 88*a* of the hub 88 when in the assembled position. The hub 88 is appropriately sized so as to fit loosely over the central tube 54 of the bowl 50 when in the assembled position. A bottom surface 88*b* of the apex 88*a* of the hub 88 rests on the top edge 54*a* of the central tube 54 when in the assembled position. Preferably, both the bottom surface 88*b* and the top edge 54*a* are smooth to minimize the frictional resistance therebetween and enable the bottom surface 88*b* to slide along the top edge 54*a* to allow for the rotation of the tray 80 with respect to the bowl 50. Preferably, the bottom of the base wall 86 is slightly raised from the bottom wall 50*a* of the bowl 50 to also facilitate rotation, although it is within the spirit and scope of the present invention that the bottom of the base wall 86 be in slidable engagement with the bottom wall 50*a* in addition to or instead of the engagement of the bottom surface 88*b* with the top edge 54*a*.

When in the assembled position, the cutting tool 40 is positioned on the adapter 36 between the apex 88*a* of the hub 88 and the inner surface area 62 of the lid 60. Preferably, the cutting tool 40 is disposed slightly lower than the rim 82 of the tray 80 such that it is completely within the tray 80 and spaced upwardly from the top edges of the interior walls 90. Preferably, each opening 64 of the lid 60 has at least a portion of an inner edge 64*a* disposed even with or slightly below the rim 82 of the tray 80 when in the assembled position which serve to abut an inner surface of the peripheral wall 84 and inhibit the inner surface of the peripheral wall 84 from coming into contact with the cutting tool 40 if minor distortions are present in the tray 80.

When in the assembled position, the cutting tool 40 at least partially blocks the user's view of the tray 80, making it somewhat difficult to align the cavities 92 with the feed tube 66. For this reason, the tray 80 preferably has discernible alignment markings 80*a* in the rim 82 to aid the user in aligning the cavities 92 with the feed tube 66. Additionally, discernible alignment markings 50*c*, 64*b* preferably are disposed in the bowl 50 and/or the lid 60 in the vicinity of the openings 64 when in the assembled position so as to further aid the user in aligning the cavities 92 with the feed tube 66. The alignment markings 80*a* are appropriately spaced along the rim 82 of the tray 80 so that when one of the pairs of alignment markings 80*a* show through the openings 64 and align with the alignment markings 50*c*, 64*b* in the bowl 50 and/or the lid 60, the user knows that the corresponding cavity 92 is aligned with the feed tube 66.

The alignment markings 50*c*, 64*b*, 80*a* can be visually and/or tactilely perceptible. Although the alignment markings 50*c*, 64*b*, 80*a* are portrayed as darkened stripes in FIGS. 1, 2, and 4, it is within the spirit and scope of the present invention that the alignment markings 50*c*, 64*b*, 80*a* be of a different form. That is, the alignment markings 50*c*, 64*b*, 80*a* could be (1) stripes, dots, or other markings colored differently from the colors of the bowl 50, the lid 60, and the tray 80; (2) slightly raised protuberances, slightly inset notches, or differently textured areas; or (3) any combination thereof. Additionally, each of the pairs of alignment markings 80*a* corresponding to each cavity 92 preferably differs in shape, color, or the like to enable the user to know which of the three cavities 92 is aligned with the feed tube 66. Also, it is contemplated that the individual alignment markings 80*a* of each pair of alignment markings 80*a* be differently denoted from one another in some way (i.e. different colors or the markings "R" and "L", for instance) to allow the user to know which alignment marking 80*a* to align in which opening 64 (i.e. aligning the left alignment markings 80*a* within the left opening 64) to insure that the cavity 92 is aligned with the feed tube 66 instead of the interior wall 90 (as would happen if the right alignment marking 80*a* were aligned within the left opening 64). It is alternatively contemplated that only one side of the bowl 50 and/or lid 60 have alignment markings 50*c*, 64*b* and that the tray 80, instead of having pairs of alignment markings 80*a*, have single alignment markings 80*a*, one corresponding to each cavity 92, so as to insure that the user does not misalign the tray 80 so that an interior wall 90 is positioned under the feed tube 66.

The tray 80 is preferably constructed of molded polymeric material. Specifically, the tray 80 is constructed of a molded styrene acrylonitrile (SAN) material. The tray 80 is not limited to being constructed of molded SAN materials and may be constructed of nearly any rigid, structural material that is able to take on the general shape of the tray 80 and withstand the normal operating conditions of the tray 80. For example, the tray 80 may be constructed of any polymeric, metal, glass, or related material that is able to take on the general shape of the tray 80 and withstand the normal operating conditions of the tray 80.

In use, the tray 80 is placed within the bowl 50, which is secured to the base housing 20. The cutting tool 40 is mounted to the adapter 36 extending upwardly from the hole 96 of the tray 80. The lid 60 is then secured to the top of the bowl 50 to fully assemble the food processor 10. The tray 80 is then rotated so as to align the first cavity 92*a* with the mouth 66*a* of the feed tube 66. A first foodstuff (not shown) is inserted within the feed tube 66, either through the hole 68*c* of the feed tube lid 68 or by opening the feed tube lid 68. It is preferable that opening the feed tube lid 68 include an interlock which prevents the motor 30 from operating while the feed tube lid 68 is open. The food processor 10 is turned on and set to the desired speed setting using the control 24 so as to begin rotation of the cutting tool 40. The user can then urge the first foodstuff downwardly toward the cutting tool 40, preferably using the food pusher 70 to do so, so as to begin the processing of the first foodstuff. Upon completion of the processing of the first foodstuff, the user can than either continue the processing of foodstuffs into the first cavity 92*a* or rotate the tray 80 to align the second cavity 92*b* with the mouth 66*a* of the feed tube 66 and begin processing a second foodstuff (not shown) into the second cavity 92*b*, thereby keeping the second foodstuff separate from the first foodstuff. In the same way, upon completion of the processing of the second foodstuff, the tray 88 can be rotated to align the third cavity 92*c* with the mouth 66*a* of the feed tube 66 in order to process a third foodstuff (not shown), thereby keeping the third foodstuff separate from the first and second foodstuffs. Upon completion of the processing of the foodstuffs, the user can remove the lid 60 from the bowl 50 and remove the cutting tool 40 from the adapter 36. The tray 80 containing the foodstuffs can be lifted out of the bowl 50. The user can then either remove the foodstuffs from the tray 80 or keep the foodstuffs within the tray 80 and use the tray 80 as a serving dish with which to serve the foodstuffs.

If desired, the food processor 10 could be used without the tray 80. When assembling the food processor 10, the user would simply not insert the tray 80 within the bowl 50. By assembling the food processor 10 in this way, the user could process foodstuffs so that the processed foodstuffs collect within the bowl 50 instead of the tray 80. When in this configuration, the food processor 10 of the present invention would operate in much the same way as other known food processors.

The food processor 10 of the present invention is configured to process different foodstuffs while keeping the different foodstuffs separate from one another. Because of this configuration, the user is not required to disassemble the food processor 10, remove the bowl 50 and remove the foodstuff therein, clean the food processor 10, and reassemble the food processor 10 before processing a second foodstuff in order to keep the foodstuffs separated. The tray 80 of the present invention allows the user to process up to three different foodstuffs, keeping each foodstuff compartmentalized within a separate cavity 92, before having to disassemble the food processor 10 to remove the contents of the bowl 50. In this way, use of the tray 80 in the food processor 10 can reduce the amount of time necessary to process different foodstuffs. Also, the use of the tray 80 could result in less cleanup for the user if the user uses the tray 80 as a serving dish. By using the tray 80 as a serving dish, the user will not have to use, dirty, and, consequently, clean separate serving dishes.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention, as defined by the appended claims.

I claim:

1. A food processor for processing foodstuffs comprising:
   a base housing;
   a motor disposed within the base housing;
   a drive shaft operatively engaged with the motor and protruding from the base housing, the motor causing rotation of the drive shaft;
   a tool rotatably securable to the drive shaft;
   a bowl removably securable to the base housing and including an inner surface area;
   a lid having an inner surface area, the lid being removably securable to the bowl to create a processing chamber between the inner surface areas of the bowl and lid in an assembled position; and
   a tray removably securable within the processing chamber, the tray being manually rotatable relative to the bowl and lid independent of the drive shaft and tool in the assembled position.

2. The food processor of claim 1 wherein the lid includes at least one opening that exposes a portion of the tray when in the assembled position.

3. The food processor of claim 2 wherein the tray includes a rim, a portion of the rim being exposed through the at least one opening.

4. The food processor of claim 3 wherein the rim is knurled.

5. The food processor of claim 2 wherein the exposed portion of the tray is graspable such that the tray is manually rotatable relative to the lid and bowl when in the assembled position.

6. The food processor of claim 2 wherein the lid includes two openings.

7. The food processor of claim 1 wherein in the tray includes a peripheral wall, a base wall, a central hub, and a plurality of interior walls, the interior walls extending radially from the hub to the peripheral wall to create a plurality of cavities.

8. The food processor of claim 7 wherein the plurality of interior walls is comprised of a first interior wall, a second interior wall, and a third interior wall, the first, second, and third interior walls creating first, second, and third cavities within the tray.

9. The food processor of claim 7 wherein the hub includes a bore therethrough, the drive shaft extending through the bore and extending from a hole at an apex of the hub when in the assembled position.

10. The food processor of claim 7 wherein the bowl includes a central tube, the hub of the tray fitting over the central tube when in the assembled position, the tray being slidably engaged with the bowl to allow for rotation of the tray relative the bowl.

11. The food processor of claim 1 wherein the lid includes a feed tube extending from an outer surface of the lid.

12. The food processor of claim 11 wherein the tray includes a plurality of cavities, the tray being manually rotatable relative to the bowl and lid when in the assembled position such that at least one of the cavities is aligned with a mouth of the feed tube.

13. The food processor of claim 12 wherein the tray and at least one of the bowl and the lid have alignment markings, the alignment markings of the tray corresponding to each of the plurality of cavities, whereby the alignment markings of the tray and at least one of the bowl and the lid are aligned with each other to align the cavity with the mouth of the feed tube.

14. The food processor of claim 1 wherein the tool is rotatably secured to a terminal end of the drive shaft.

15. The food processor of claim 14 wherein the tool is positioned between the tray and the inner surface area of the lid in the assembled position.

* * * * *